United States Patent [19]

Besnard

[11] Patent Number: 4,977,451

[45] Date of Patent: Dec. 11, 1990

[54] PROCESS AND APPARATUS FOR AUTOMATIC SURVEILLANCE OF A SITE

[76] Inventor: Serge Besnard, 3, rue Paul Gauguin, 91440 Bures/Yvette, France

[21] Appl. No.: 452,652

[22] Filed: Dec. 19, 1989

[30] Foreign Application Priority Data

Dec. 21, 1988 [FR] France ..................... 88 16939

[51] Int. Cl.[5] .................... H04N 7/18

[52] U.S. Cl. .................... 358/108; 358/105; 358/139

[58] Field of Search ............ 358/105, 108, 113, 139, 358/296, 310, 906; 360/1, 33.1, 55, 88

[56] References Cited

U.S. PATENT DOCUMENTS

| | | | |
|---|---|---|---|
| 4,001,881 | 1/1977 | Folsom | 358/108 |
| 4,161,750 | 7/1979 | Kamin | 358/105 |
| 4,408,224 | 10/1983 | Yoshida | 358/108 |
| 4,651,143 | 3/1987 | Yamanaka | 358/108 |

FOREIGN PATENT DOCUMENTS

| | | | |
|---|---|---|---|
| 2219330 | 11/1973 | Fed. Rep. of Germany . | |
| 2710781 | 9/1978 | Fed. Rep. of Germany . | |
| 3015737 | 11/1980 | Fed. Rep. of Germany . | |
| 3716319 | 5/1987 | Fed. Rep. of Germany . | |
| 2082432 | 10/1971 | France . | |
| 0005532 | 11/1979 | Italy | 358/108 |
| 8809023 | 11/1988 | PCT Int'l Appl. . | |

*Primary Examiner*—Howard W. Britton
*Assistant Examiner*—Safet Metjahic
*Attorney, Agent, or Firm*—Lowe, Price, Leblanc, Becker & Shur

[57] ABSTRACT

The invention relates to a system for automatic surveillance of a site by recording data collected by a video camera 3 upon the occurrence of an incidental event (e.g. a road accident). The apparatus comprises an accident detector and a video tape recorder equipped with a controller device that causes the recorder to operate on successive sections of the magnetic tape, each section corresponding to a sequence of predetermined length. At the end of recording on each section, the controller determines whether to continue recording images either repeatedly on the same section after returning to the beginning thereof, in the case of there being no accident or, in the case of an accident, recording the images onto the following section. The autonomy of the magnetic tape recorder is thereby considerably increased.

14 Claims, 3 Drawing Sheets

PROCESS AND APPARATUS FOR AUTOMATIC SURVEILLANCE OF A SITE

BACKGROUND OF THE INVENTION

1. Field of the Invention

The present invention relates first of all to an automatic surveillance process for a site in which the occurrence of incidental events is awaited, and according to which a recording is made, on an erasable medium of finite storage capacity, of data collected at the time of occurrence of an awaited event.

Here, the term "site" used in the present context should be understood in its broadest definition. Among other things, it can encompass a communications link (such as a road junction), a commercial site (e.g. a warehouse), an industrial site (e.g. nuclear power station), or a private site (e.g. a dwelling). The common denominator to all the sites to which the inventive process is applicable is that they can be the scene of provoked or unprovoked events all having a random nature, i.e. which are probable but unpredictable, with more or less serious consequences. In general, it is not possible to analyze the cause or conditions of occurrence of such events or even to acquire a proof that such an event has really taken place, in the absence of automatic recording.

2. Description of the Prior Art

Various procedures are known to ensure the surveillance of specific sites—highways, commercial and industrial premises—based on networks of cameras whose images are analyzed in real time by security personnel. Because of the large cost of maintaining personnel 24 hours a day, these procedures are confined to very high risk security situations where it is necessary to intercept assault and robbery attempts.

In the absence of round-the-clock personnel, events with a very low repetition rate require such long recordings for their surveillance, that it would be necessary to resort to multiple reloadings of the recording medium, and these opertions can be subject to neglect, delays, and are besides considerably cost intensive. Consequently, it is easy to imagine the probability of an awaited event not being recorded. Moreover, the subsequent exploitation of such continuous recordings call for the very lengthy process of playing back and viewing the complete recording to seek the relatively short useful part on which the event is recorded.

SUMMARY OF THE INVENTION

The aim of the present invention is to overcome the above-mentioned drawbacks and, in particular, to avoid having to proceed to regular loading of the recording medium, by virtue of a multiplication of its useful recording time. The present invention achieves these advantages through a process essentially comprising the steps of dividing the said recording medium into a series of successive sections each corresponding to a fraction of the total recording length provided by said medium; wherein, while said awaited event does not occur, repeatedly recording, on a same section of said medium, data collected in the course of time, with concomitant erasure of data previously recorded on that section; and when said awaited event occurs, causing a transfer from said same section to the following section, on which is continued said data recording, without erasure of data recorded on the previous section.

In this way, the data collected in a continuous manner are recorded in real time after which, at the end of each section of the recording medium, they are either conserved or erased to make room for other subsequent data depending on whether or not the awaited event occurred during the recording on that section. Thus, the only recorded sequences that are permanently memorized are those that encompass the occurrence of the incidental event, so considerably multiplying the useful capacity of the recording medium.

The present invention also relates to an apparatus for recording collected data upon the occurrence of an awaited incidental event, the said apparatus comprising at least one data sensor and a recorder receiving data collected from said sensor and storing said data on an erasable storage medium, wherein said apparatus comprises a detector signalling the appearance of an awaited event, and controlling means for operating said recorder on successive sections of said medium, each section corresponding to a sequence having a predetermined time period, and for commanding, at the end of each recording on each section, either a continuation of the recording on the section just ended, after a return to the beginning thereof, in the absence of said event, or a continuation onto the succeeding section upon detection of said event.

The data to be recorded can be gathered by a video camera or any sensor acquiring data descriptive of said event.

The recorder can be of the type that uses a magnetic medium, an optical medium, or a semi-conductor memory. It is essential that it be provided with means for controlling the recording, erasing, positioning and fast scanning of recorded sequences.

The event detector must be adapted to the phenomenon and site to be monitored. It should deliver a signal upon the occurrence of an event and can be in the form of a cross-over sensor, shock-detector, noise sensor, light sensor, magnetic field sensor, or any other device sensitive to a characteristic phenomenon of the event. The control device can be used to partition the recording medium into successive sections by producing, at determined instants, recording start and end commands that define the start and end of each section on the medium. The control device can then be used to trigger the transition from one section of the recording medium to the next by suppressing or ignoring the end-of-recording command which would otherwise cause the return to the start of the section.

Preferably, the instants marking the start and end of a section are determined by a timing generator for the first recording on a section of the medium and, for each repeated recording on the same section, by using as reference the running of the medium between the instants marking the start and end of the first recording. This procedure eliminates any risk of a gradual drift in the positioning of the medium, when adjusting the recording to a new given section, which could slice away the preceding section bearing useful information.

The indexing on the recording medium can be obtained from a tape counter associated with the recorder for identifying the position of the recording medium, where the start and end instants of each recording repeated on a same section are those for which the tape counter produces the same identification data as produced at the start and end instants of the first recording on that section, the latter being memorized in the control device. The index markings can then be obtained from the recording medium itself, while the start and end instants of each repeated recording on a same section are those at which are read the pulses recorded on the support medium at the start and end instants of the first recording.

In order to limit the wear on the recording medium to a reasonable degree, in cases where the recording procedure is repeated a great number of times if the awaited event only occurs after a long interval, the control device can be made to trigger the transition from one section to the next when the number of re-recordings on a same section has reached a predetermined maximum value.

Advantageously, the apparatus is equipped with a clock and a device for recording on the medium the data and time at which each data sequence was recorded, thus enabling all retained sequences to be dated.

In many applications, the recorder will be a video tape type image recorder, the apparatus comprising a video camera type data sensor, so as to be able to pick and store images of the site and other mobile objects contained therein during the times of the incident. In particular, this would be the case for an apparatus designed to be installed for surveillance of a highway, the apparatus also comprising at least one event detector capable of responding in the case of an abnormal vehicle manoeuvre forecasting an incident or accident.

BRIEF DESCRIPTION OF THE DRAWINGS

Other characteristics and advantages of the present invention shall be more clearly understood from reading the following description of a non-limiting embodiment of the invention, with reference to the appended drawings in which.

DESCRIPTION OF THE PREFERRED EMBODIMENTS

Figure 1:
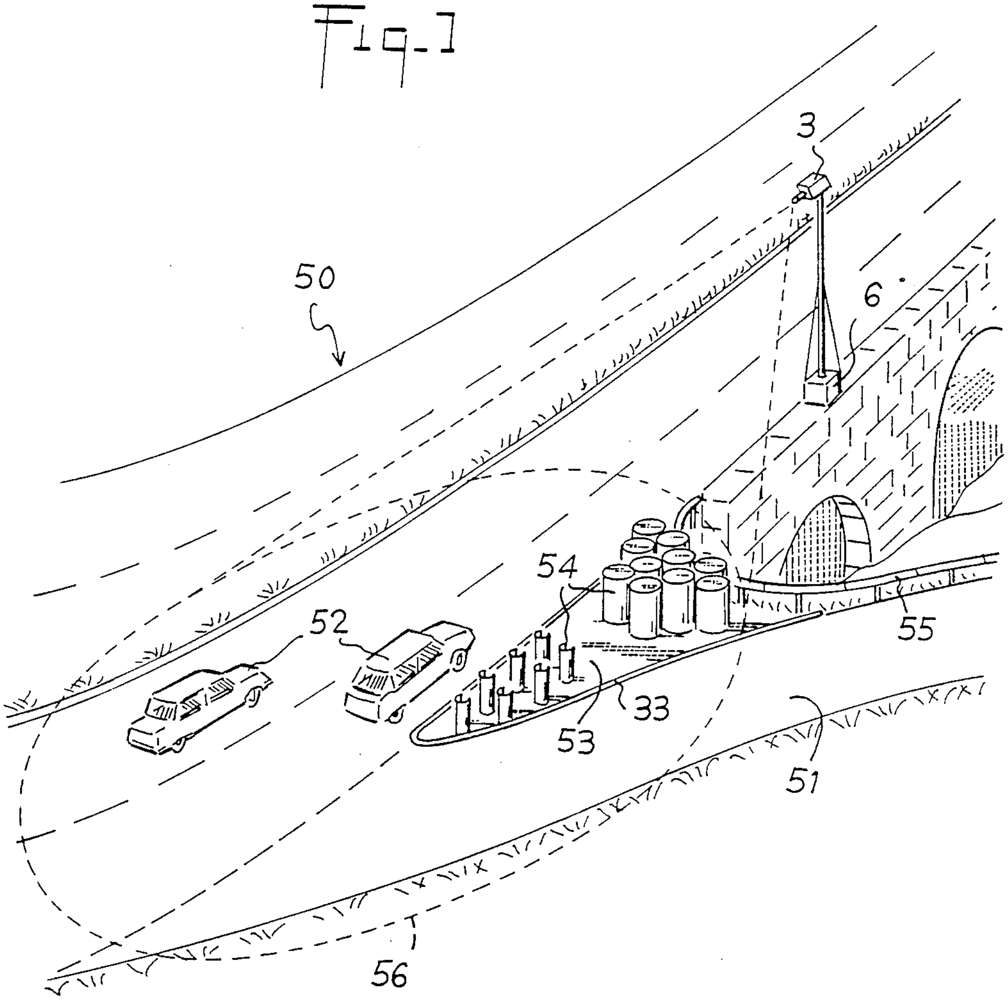
FIG. 1 depicts a highway fitted with a surveillance apparatus according to the invention.

In FIG. 1 there is shown a portion of a highway 50 comprising an approach road 51 allowing vehicles 52 traveling in a particular direction along the highway to leave the latter. In the triangular zone 53 formed by the island separating the approach road 51 from the highway there are placed elements 54 intended to warn off drivers from penetrating into that zone with their vehicles, these elements further serving, should a vehicle penetrate, to dampen the shock on the safety barrier 55 bordering the highway and the approach road.

It has been observed in practice that such a region of the highway is hazardous and occasionally a scene of incidents such as the penetration into zone 53 by a vehicle whose driver engaged on the wrong lane, or even accidents in extreme cases due e.g. to excessive speeds. In the latter case, the signifant event is either the accident itself or the numerous dangerous manoeuvres of the vehicles whose sequences can be analyzed to help in remedying the hazards of the site. These events are all characterized by the passage of vehicles into zone 53. However, it is always difficult to reconstitute the sequence of events after it has taken place when trying to understand and research into methods for preventing its renewal.

Therefore, the apparatus according to the invention can be installed on the site shown to provide automatic surveillance and produce a recording of abnormal scenes regarding traffic at that site.

The apparatus essentially comprises a video camera 3, whose field of view covers the part 56 of the site considered to be hazardous, and a housing 6 containing an image recorder and a control device to which is connected an event detector 33 comprising e.g. a pneumatic tube surrounding the zone 53 and triggering an electrical contact when a vehicle makes an unwarranted penetration into that zone.

Figure 2:
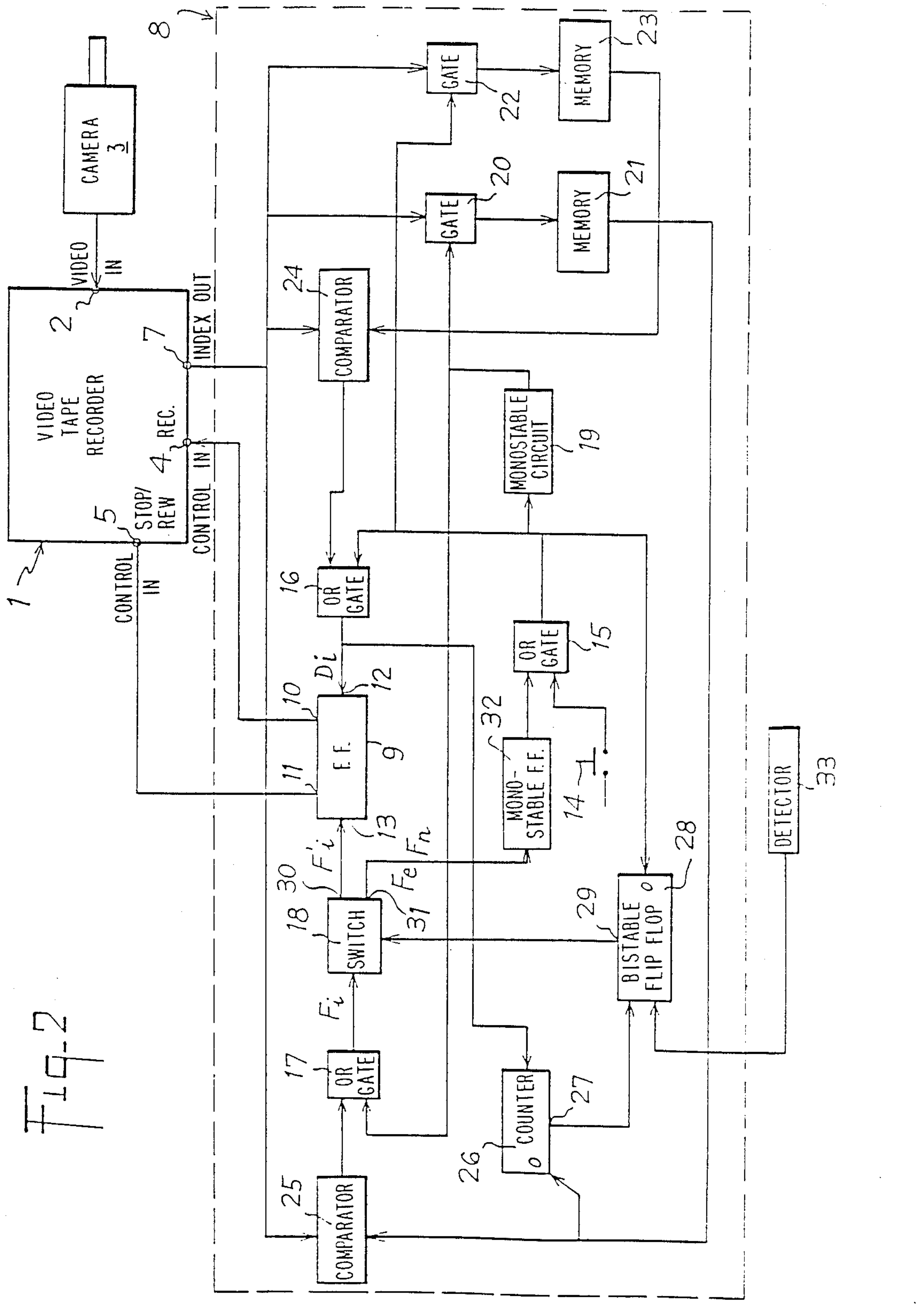
FIG. 2 is a block diagram of the control device for the apparatus of FIG. 1.

The FIG. 2 shows the above-mentioned recorder, in this case video tape-recorder 1, whose video recording input 2 is connected to a camera 3. The video tape-recorder 1 is further fitted with control means for recording the video signal from the camera 3 on its recording medium (magnetic tape), a control input 5 for rewinding the recording medium, and an output 7 from which is delivered at any time an indexing signal for the position of the magnetic tape, the signal being produced by the tape counter associated with the recorder.

The operation of the recorder 1 is governed by the control device 8 which essentially comprises an electronic circuit. The latter has a bistable flip-flop 9 whose outputs 10, 11 are respectively connected to the inputs 4 and 5 of the recorder. When a pulse Di is applied to the input 12 of the flip-flop 9 its output 10 goes to logic "1" and thereby commands the playing of the magnetic tape with recording of the video information from camera 3 and erasure of any information previously recorded on the tape. When a pulse F'i is applied to the other input 13 of the flip-flop 9, its other output 11 goes to logic state "1", thereby causing the tape to stop and rewind.

To set the apparatus in operation (it is here assumed that the magnetic tape in the recorder is rewound), switch 14 is actuated to cause a pulse D1 (FIGS. 3-*a, d*) to be applied at the input 12 of flip-flop 9 via an OR-gate 15, 16. The playing of the tape with recording of the video signal delivered by the camera 3 then starts and continues until there is applied a pulse F1 (FIG. 3-*e*) to both the input 13 of flip-flop 9, via an OR-gate 17, and a switching circuit 18. The pulse F1 is delivered by a monostable 19 at the end of the section's playing time (FIG. 3-*b*), the latter also being triggerable by a push-button 14 via OR-gate 15. This time defines the duration of the first recording section I on the magnetic tape (e.g. 5 minutes). Rewinding the tape brings this section to its beginning. The pulse delivered by monostable 19 after a time interval T also opens a gate 20 allowing the tape index signal from output 7 of the recorder to be applied to a memory 21. Likewise, the trigger pulse of monostable 19 opens a gate 22 which allows the tape index signal from output 7 to be applied to memory 23. The thus-stored index signals in memories 23 and 21 respectively identify the start and end of the section I.

The rewind phase of the tape ends when the latter has returned to its start, this condition being detected by a comparator 24 receiving the index signal from the output 7 and the contents of memory 23, which was initially at zero. The comparator then produces a pulse D2 (FIG. 3-*d*) which is applied to the input 12 of flip-flop 9 via OR-gate 16, causing the flip-flop 9 to change state once again. This causes the restart of the normal running of the tape, with erasure of previously recorded information, on the section I in question, and the recording of subsequent information on this same section, until a comparator 25 determines that the index signal at the output 7 is identical to the contents of memory 21 which identify the end of the section on the medium. The comparator then delivers a pulse F2 which is applied to the input 13 of flip-flop 9 via circuits 17 and 18.

The recording procedure is thus repeated on section I of the magnetic tape, with interspersed rewind phases (indicated by hatched portions in FIG. 3-*f*), the start and end of recording instants being determined by comparators 24, 25 receiving on the one hand the index signal supplied by the comparator while the tape is driven forward or backward, and on the other the contents of memories 23 and 21 which correspond to the index signal supplied by the counter, respectively at the start and end of the section.

In this way, the recording of the video signal delivered by the camera 3 is carried out in successive sequences repeatedly on the same first section I of the magnetic tape, each new recorded sequence taking the place of the previously recorded sequence.

Considering that the number of re-recordings possible on a magnetic tape can be very great (on the order of 10,000 to 15,000) without any noticeable loss of signal quality during play-back, it can be realized that the autonomy of the tape becomes vastly increased, being multiplied by that number. Thus, a magnetic tape having a nominal playing time of one hour will have its maximum autonomy (in the absence of events) raised to 10,000 or 15,000 hours, in other words one year or more.

Figure 3:
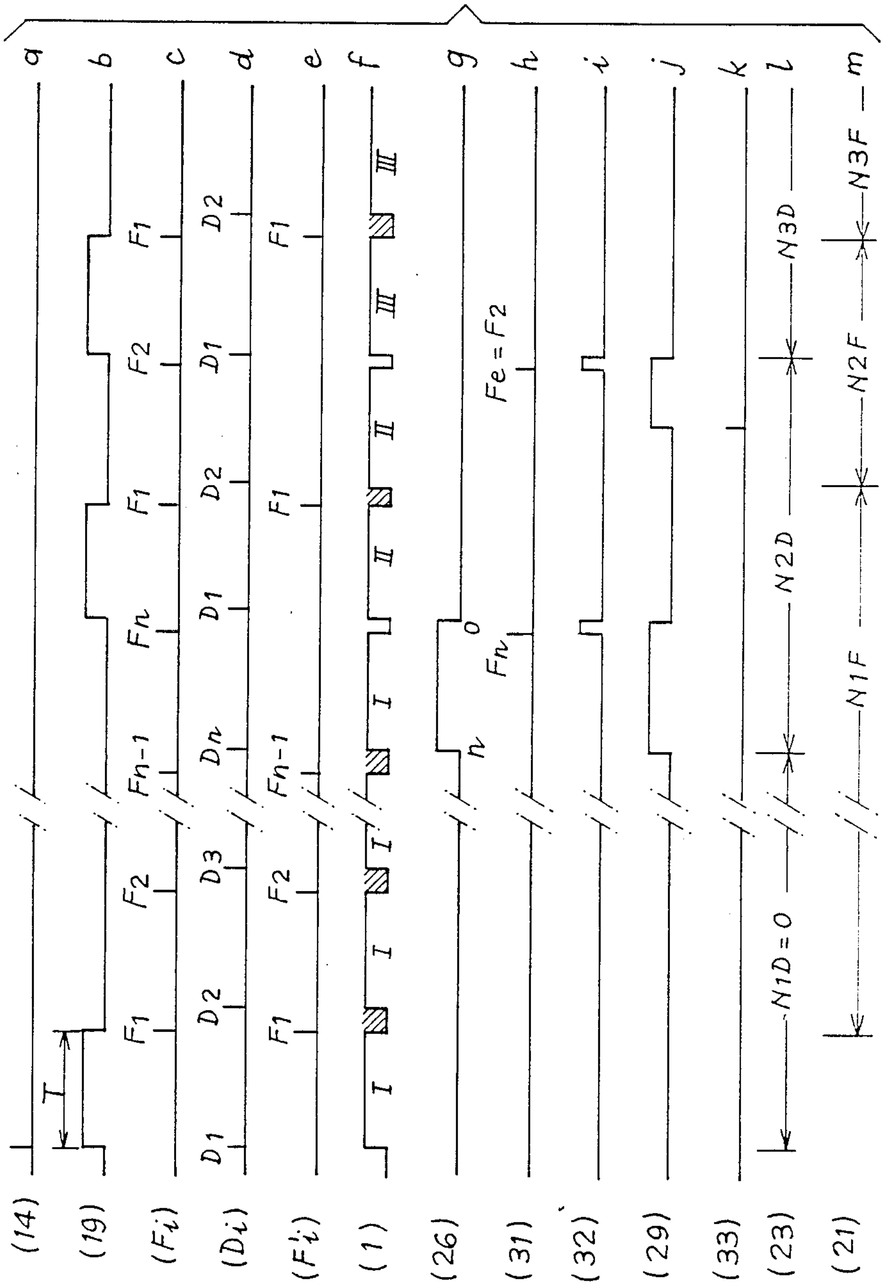
FIG. 3 is a timing diagram of the signals or operating states at various points in the control device.

For reasons of reliability, it is recommended to limit the number I of repetitions on each section to the maximum value permitted by the tape used. To that end, the section start pulses Di, applied to the input 12 of flip-flop 9, are also applied to a counter 26 which sums the number of repetitions on a same section (for instance section I). When this counter receives a pulse Dn corresponding to the maximum number n of permitted repetitions (FIG. 3-*d*), its output 27 changes state (FIG. 3-*g*) and activates a bistable flip-flop 28 whose output 29 (FIG. 3-*j*) controls switching circuits 18 so that the latter transfers the following end of section pulse Fn (FIG. 3-*c*) delivered by OR-gate 17, not to its first output 30 connected to the flip-flop 9, but instead to the second output 31. The pulse Fn is thus eliminated from the end of section pulse sequence F'i (FIG. 3-*e*) produced at the output 30 of circuit 18. Accordingly, flip-flop 9 does not change state at the moment when pulse Fn appears and the recording therefore continues on the magnetic tape beyond the section I, i.e. on the flowing section (section II), delimited by new pulses D1, F1 for the start and end of the section. These pulses are produced at the start and end of the time period T of monostable 19, as for the first section I. To that end, the pulse Fn produced at the output 31 of circuit 18 (FIG. 3-*h*) is applied to monostable 19 via OR-gate 15 and another monostable flip-flop 32 serving to introduce a small time margin between the end of section I and the beginning of section II (FIG. 3-*i*). The control pulse for monostable 19 is also applied to gate 22 so that the position index signal of the tape produced at the output 7 of the recorder 1 at the start of section 2 is written into the memory 23. Likewise, the index signal corresponding to the end of section II is written into memory 21 via gate 20. Accordingly, the recording of a video signal continues onto section II, with re-recordings, as for section I (FIG. 3-*f*), the flip-flop 28 being returned to its initial state by the drive pulses from monostable 19 to bring the switching circuit 18 into the configuration where it directs the input pulses Fi to its first output 30.

If the detector 33 connected to flip-flop 28 detects an awaited incidental event—which, in FIG. 3, is supposed to have happened shortly after the second pulse D2 for the start of section II (FIG. 3-*k*)—the flip-flop changes state, just as with the nth start of section pulse Dn (FIG. 3-*j*). Accordingly the following end of section pulse Fe, in this case F2, is eliminated from the signal F'i applied to the input 13 of flip-flop (FIG. 3-*e*) in order to be switched over to the monostables 32, 19 (FIG. 3-*h*) so that there is no rewinding of the magnetic tape at the end of section II, but a continuation of the recording into the next section, i.e. section III (FIG. 3-*f*) the information recorded on section II at the time of the incidental event thereby being saved.

Written into the memories 23, 21 are the successive position index signals of the magnetic tape produced by the tape counters of the recorder 1 during the first recording on each section whose beginning and end of section are defined by the monostable 19. Thus, as shown in FIG. 3-1, m, memory 23 successively contains index signals N1D, N2D, N3D, . . . for the beginning of sections I, II, III, . . . , and memory 21 likewise contains index signals N1F, N2F, N3F, . . . for the end of sections I, II, III, . . . , the signals being written into the memories at the start and end of the time period T produced by the monostable 19. These stored start and end of section signals define the start and end instants for rewinding of the magnetictape, so that the starting and end points of each section are defined in terms of the running of the tape itself, as measured by the recorder's tape counter. This arrangement prevents the risk of a drift from occurring in the course of successive re-recordings on a same section of the tape, as would otherwise occur if there were no position references made on the tape itself to define the recording sections provided successively throughout its length. A drift in the starting point of each section tending towards the beginning of the tape would risk the gradual erasure of the preceding section, that would normally contain a recording produced at the moment of an incidental event.

In a variation, the recording of the pulses coinciding with the start and end of the first recording on a section can be made on the sound track of the magnetic tape. These instances would be defined by the time period T of the generator (monostable 19), the indexes for subsequent recordings on the sections being determined by reading the corresponding pulses written into the sound channel of the tape.

Furthermore, to guarantee an accurate repositioning of the tape at the beginning of a section, the rewind stage can be divided into a fast rewind followed by a slow rewind, the latter starting shortly before reaching the start of the section on which must be repeated the recording process.

In the case where the event occurs at an instant close to the end of the recording on a section, the information relative to that event—in this case images of the incident or road accident sensed by the camera 3—would be recorded over too short a time period to allow adequate later analysis into the circumstances of that event. Advantageously, therefore, a time extension of the recording on the section in question can be provided e.g. simply by delaying by a predetermined time lapse the end of section pulse Fi that immediately follow the event.

What is claimed is:

1. An automatic surveillance process for a site in which the occurrence of incidental events is awaited, according to which a recording is made, on an erasable medium of finite storage capacity, of data collected at the time of occurrence of said awaited event; wherein said process essentially comprises:

dividing said recording medium into a series of successive sections each corresponding to a fraction of the total recording length provided by said medium;

while said awaited event does not occur, repeatedly recording on a same section of said medium data collected in the course of time, with concomitant erasure of data previously recorded on that section;

when said awaited event occurs, causing a transfer of said same section to the following section, on which is continued said data recording, without erasure of data recorded on the previous section.

2. An apparatus for recording collected data upon the occurrence of an awaited incidental event, said apparatus comprising at least one data sensor and a recorder receiving said collected data and storing said data on an erasable storage medium, wherein said apparatus comprises a detector signalling the appearance of an awaited event, and controlling means for operating said recorder on successive sections of said medium, each section corresponding to a sequence having a predetermined time period, and for commanding, at the end of recording on each section, either a continuation of the recording on the section just ended, after a return to the start thereof, in the absence of said event, or a continuation onto the succeeding section, upon detection of said event.

3. The apparatus as claimed in claim 2 wherein said controlling means produce, at set instants, commands to start and end recording, said commands defining the start and end of each section of said medium.

4. The apparatus as claimed in claim 3, wherein said control means triggers the changeover from one section of the recording medium to the next by suppressing or ignoring said end of recording command, which would otherwise trigger a return to the start of the section.

5. The apparatus as claimed in claim 3, wherein the instants marking said start and said end of section are determined by timing means for the first recording on a section of said medium and, for each repeated recording on the same said section, by reference to the operation of said medium from the instants marking said start and end of said first recording.

6. The apparatus as claimed in claim 5, wherein said reference to the operation of said medium is obtained by means of a tape counter cooperating said recorder to identify the position of the recording medium, and said instants marking said start and said end of each recording repeated on a same section are those when said tape counter produces the position references that are the same as those produced at the start and end of said first recording on that section, said position references being stored in said control means.

7. The apparatus as claimed in claim 5, wherein said reference is derived from the recording medium itself, and said instants marking said beginning and said end of each recording repeated on a same section are those at which are read pulses recorded on said medium at instants marking said start and said end of the first recording.

8. The apparatus as claimed in claim 2, wherein said control means also triggers a changeover from one section to the next when the number of re-recordings on a same section has attained a predetermined maximum value.

9. The apparatus as claimed in claim 2, wherein there is further comprised a clock and means for recording on said medium the time and date of recording of each data sequence.

10. The apparatus as claimed in claim 2, wherein said recorder is a video tape recorder and said data sensor is a video camera.

11. The apparatus as claimed in claim 2, wherein said apparatus is designed to be installed in the region of a highway to ensure the surveillance thereof, and comprises at least one event detector capable of responding upon the occurrence of an abnormal behavior shown by a vehicle, signalling an imminent incident or accident.

12. The apparatus as claimed in claim 2, wherein said apparatus is designed to be installed in a commercial, industrial or private site so as to ensure the surveillance thereof.

13. A method for automatically recording and saving on a nonvolatile erasable medium of finite information storage capacity information received from a sensor prior to, contemporaneously with, and subsequent to an unpredicted event, comprising the steps of:

(a) dividing said recording medium into a series of successive sections each constituting a portion of the total information recording capacity of said medium;

(b) designating one of said sections as an interim storage section;

(c) recording information received from said sensor in said interim storage section;

(d) detecting a non-occurrence of said event to be recorded;

(e) erasing information recorded in said interim storage section;

(f) repeating steps c, d and e while detecting said non-occurrence of said event to be recorded;

(g) detecting an occurrence of said event to be recorded;

(h) recording information received from said sensor in said interim storage section;

(i) designating a next one of said successive sections as said interim storage section; and (j) repeating steps c, d and e while detecting said non-occurrence of said event to be recorded and repeating steps g, h and i while detecting said occurrence of said event to be recorded.

14. An apparatus for recording and storing data collected from a sensor prior to, during, and subsequent to an unpredicted trigger event, comprising:

event sensor means for detecting an occurrence of said trigger event and, in response, supplying a record control signal;

memory means including a nonvolatile, erasable storage medium having a finite information storage capacity for recording information, said storage medium including a series of successive sections each constituting a portion of the total information recording capacity of said medium;

memory section designation control means for designating one of said storage medium sections as an interim storage portion and, in response to said record signal indicating an occurrence of said predetermined trigger event, designating a next one of said storage medium sections as said interim storage section;

sensor means for detecting data and supplying a data signal representative thereof;

recording means receiving said data signal and continually recording said data on said designated interim storage portion of said storage medium from an initial end to a terminal end of said interim storage portion;

re-recording control means responsive to record control signal and to said recording means reaching said terminal end of said interim storage portion for erasing data recorded on said designated interim storage portion and reinitializing said recording means to said initial end of said interim storage portion when said predetermined trigger event has not been detected during a time period in which said recording means records data from said initial end to said terminal end of said interim storage portion; and storage medium advancing means responsive to record control signal and to said recording means reaching said terminal end of said interim storage portion for advancing said recording means to said next one of said storage medium sections designated as said interim storage portion by said memory section designation control means whereby previously recorded data is retained upon detection of said trigger event.

* * * * *